United States Patent
Jang (10) Patent No.: US 11,940,335 B2
(45) Date of Patent: Mar. 26, 2024

(54) BATTERY TEMPERATURE DETECTION SYSTEM AND METHOD

(71) Applicant: LG Chem, Ltd., Seoul (KR)

(72) Inventor: Ho Sang Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 569 days.

(21) Appl. No.: 16/640,135

(22) PCT Filed: Oct. 15, 2018

(86) PCT No.: PCT/KR2018/012110
§ 371 (c)(1),
(2) Date: Feb. 19, 2020

(87) PCT Pub. No.: WO2019/078559
PCT Pub. Date: Apr. 25, 2019

(65) Prior Publication Data
US 2021/0080332 A1 Mar. 18, 2021

(30) Foreign Application Priority Data
Oct. 16, 2017 (KR) .................. 10-2017-0133982

(51) Int. Cl.
*G01K 7/22* (2006.01)
*H01M 10/42* (2006.01)
*H01M 10/48* (2006.01)

(52) U.S. Cl.
CPC ............ *G01K 7/22* (2013.01); *H01M 10/425* (2013.01); *H01M 10/486* (2013.01); *H01M 2010/4271* (2013.01)

(58) Field of Classification Search
CPC ............ H01M 10/425; H01M 10/486; H01M 2010/4271
USPC ........................................ 702/133
See application file for complete search history.

(56) References Cited

U.S. PATENT DOCUMENTS

| 5,929,344 | A | 7/1999 | Hays et al. |
| 2004/0114667 | A1 | 6/2004 | Sumimoto et al. |
| 2010/0198546 | A1 | 8/2010 | Kamata |
| 2010/0270973 | A1 | 10/2010 | Miyazaki et al. |
| 2012/0068545 | A1 | 3/2012 | Shim |
| 2013/0041607 | A1 | 2/2013 | Zimmerman et al. |
| 2014/0312910 | A1 | 10/2014 | Cho et al. |

(Continued)

FOREIGN PATENT DOCUMENTS

| CN | 101872988 A | 10/2010 |
| CN | 102403753 A | 4/2012 |
| JP | H11237286 A | 8/1999 |

(Continued)

OTHER PUBLICATIONS

English translation of JP 2008-151535, Jul. 2008. (Year: 2008).*

(Continued)

*Primary Examiner* — Michael P Nghiem
(74) *Attorney, Agent, or Firm* — Lerner David LLP (57) ABSTRACT

A system and a method of detecting a temperature of a battery, which calculate a resistance value of a temperature detecting unit based on a size of a voltage applied to the temperature detecting unit connected with a battery for measuring a temperature of the battery, and detect the temperature of the battery connected with the temperature detecting unit based on the calculated resistance value.

8 Claims, 6 Drawing Sheets

(56) References Cited

U.S. PATENT DOCUMENTS

| | | |
|---|---|---|
| 2015/0244192 A1 | 8/2015 | Dauchy et al. |
| 2017/0179550 A1 | 6/2017 | Tanigawa et al. |

FOREIGN PATENT DOCUMENTS

| | | |
|---|---|---|
| JP | 2001511549 A | 8/2001 |
| JP | 2003324802 A | 11/2003 |
| JP | 2004150800 A | 5/2004 |
| JP | 2004157024 A | 6/2004 |
| JP | 2008151535 A * | 7/2008 |
| JP | 2008151535 A | 7/2008 |
| JP | 2009109271 A | 5/2009 |
| JP | 2011075530 A | 4/2011 |
| JP | 2012517012 A | 7/2012 |
| JP | 2013160505 A | 8/2013 |
| JP | 2014211307 A | 11/2014 |
| JP | 2015532575 A | 11/2015 |
| JP | 2016057173 A | 4/2016 |
| KR | 20120029500 A | 3/2012 |
| KR | 20140125473 A | 10/2014 |
| KR | 20150009312 A | 1/2015 |
| KR | 20160080381 A | 7/2016 |

OTHER PUBLICATIONS

English translation of JP 2009109271, May 21, 2009. (Year: 2009).*
International Search Report for Application No. PCT/KR2018/012110, dated Jan. 25, 2019, pp. 1-3.
Supplemental European Search Report for Application No. 18867901.3 dated Jun. 19, 2020, 2 pages.
Search Report dated Jun. 10, 2022 from Office Action for Chinese Application No. 201880042954.5 dated Jun. 17, 2022. 3 pgs.

* cited by examiner

FIG. 1

PRIOR ART

BATTERY TEMPERATURE DETECTION SYSTEM AND METHOD

CROSS-REFERENCE TO RELATED APPLICATIONS

The present application is a national phase entry under 35 U.S.C. § 371 of International Application No. PCT/KR2018/012110 filed Oct. 15, 2018, published in Korean, which claims priority from Korean Patent Application No. 10-2017-0133982 filed Oct. 16, 2017, all of which are incorporated herein by reference.

TECHNICAL FIELD

The present invention relates to a system and a method of detecting a temperature of a battery, and more particularly, to a system and a method of detecting a temperature of a battery, which calculate a resistance value of a temperature detecting unit based on a size of a voltage applied to the temperature detecting unit connected with a battery for measuring a temperature of the battery, and detect the temperature of the battery connected with the temperature detecting unit based on the calculated resistance value.

BACKGROUND ART

In general, in a secondary battery, a plurality of unit secondary battery cell may be united and be used as one battery module, and a plurality of battery modules may be united and used depending on the case in an environment requiring high capacity, such as electric vehicle, an energy storage system, and a non-interrupting electric source supply device.

When the plurality of battery modules is used together, the battery module is overheated due to an abnormal operation, such as an over current and an over voltage, and thus a problem in that the battery module may explode and become damaged and the like may occur. When the plurality of battery modules is united and used for solving the problem, it is necessary to prevent abnormality from being generated in the battery module by always measuring and detecting a voltage, a current, and a temperature of each individual module.

Figure 1:
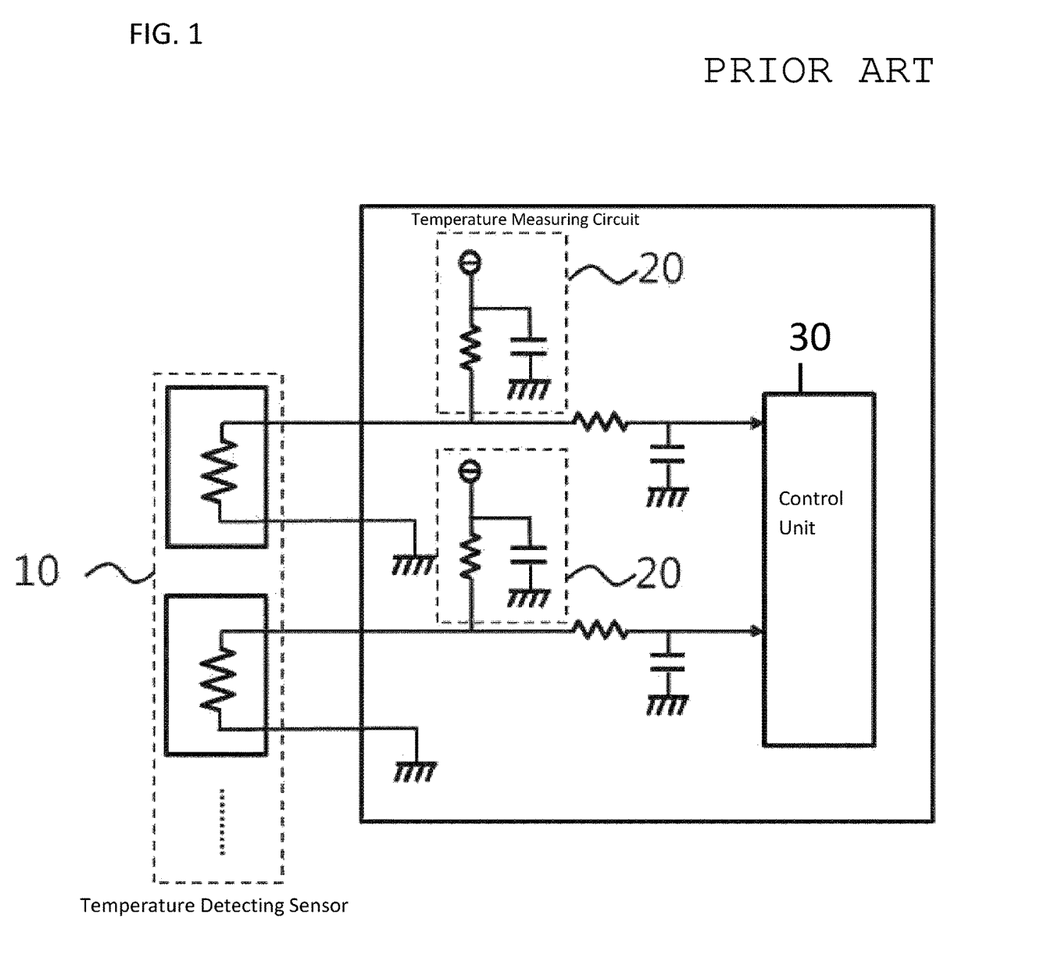
FIG. 1 is a diagram schematically illustrating a system for detecting a temperature of a battery in the related art.

As illustrated in FIG. 1, in a system for detecting a temperature of a battery in the related art, in order to solve the problem, a temperature detecting sensor 10, which detects a temperature of a battery module, and a temperature measuring circuit 20, which measures a temperature value by using information sensed by the temperature detecting sensor 10, are installed in each of the plurality of battery modules to measure a temperature of each of the battery modules. However, in the system for detecting a temperature of a battery in the related art, it is necessary to install the temperature measuring circuit 20 in every battery module, so that there is a problem in that a volume of a component is increased to degrade efficiency, and cost is increased.

In this respect, in order to solve the problem of the system for detecting a temperature of a battery in the related art, the present inventors developed a system and a method of detecting a temperature of a battery, in which a plurality of temperature detecting sensors detects a temperature of a battery module by commonly using one reference resistor, so that it is not necessary to provide a temperature measuring circuit to each temperature detecting sensor connected to a battery module.

DETAILED DESCRIPTION OF THE INVENTION

Technical Problem

The present invention is conceived to solve the foregoing problems, and the present invention provides a system and a method of detecting a temperature of a battery, which, in order to measure a temperature of one or more batteries, apply one or more temperature detection voltages by connecting one or more temperature detecting units, which are connected to one or more batteries, respectively, and a reference resistor, and calculate a resistance value of each of the one or more temperature detecting units based on a voltage value of the applied temperature detection voltage, and detect temperatures of the one or more batteries connected to the one or more temperature detecting units based on the calculated resistance value.

Technical Solution

An exemplary embodiment of the present invention provides a system for detecting a temperature of a battery, the system including: one or more temperature detecting sensors, which are connected with one or more batteries, respectively; and a battery management system (BMS) configured to connect the one or more temperature detecting sensors with a reference resistor and apply a temperature detection voltage to the one or more temperature detecting sensors, calculate resistance values of the one or more temperature detecting sensors based on a voltage value of the applied temperature detection voltage, and detect a temperature of the one or more batteries connected with the one or more temperature detecting sensors, respectively, based on the calculated resistance value.

In the exemplary embodiment, the system may further include a connecting unit, configured to perform multiplexing on the one or more temperature detecting sensors, and select any one or more temperature detecting sensors among the one or more temperature detecting sensors and connect the selected one or more temperature detecting units to the reference resistor, in which the BMS may include a switch, which is interposed between the reference resistor and a temperature detection voltage source and which is configured to control application of the temperature detection voltage by the temperature detection voltage source.

In the exemplary embodiment, the BMS may be configured to connect the one or more temperature detecting sensors selected by the connecting unit with the reference resistor and the temperature detection voltage source, and disconnect one or more temperature detecting sensors, which are not selected by the connecting unit, from the temperature detection voltage source, and when the connecting sensor does not select any temperature detecting unit, block a space between the reference resistor and the temperature detection voltage source by controlling the switch.

In the exemplary embodiment, the one or more temperature detecting sensors may include one or more thermistors, respectively.

In the exemplary embodiment, the reference resistor may be connected with a temperature detecting sensor located at a foremost end among the one or more temperature detecting sensors, and the one or more temperature detecting sensors may be sequentially connected from the temperature detecting sensor located at the foremost end to a temperature detecting unit located at a rearmost end.

In the exemplary embodiment, when the reference resistor and the one or more temperature detecting sensors are connected, the BMS may be configured to calculate voltage values of the temperature detection voltages to be applied to the one or more connected temperature detecting sensors, based on Equation 1 below.

$$V_n = \frac{\sum_{a=n}^{m} R_a}{R_p + R_T} \times V_p \qquad \langle\text{Equation 1}\rangle$$

wherein, $V_n$ is a voltage value of the temperature detection voltage to be applied to an $n^{th}$ temperature detecting sensor, m is a number of one or more connected temperature detecting sensors, $R_p$ is a resistance value of the reference resistor, $R_T$ is a sum of resistance values of the one or more connected temperature detecting sensors, $\sum_{a=n}^{m} R_a$ is a sum of resistance values from the $n^{th}$ temperature detecting sensor to an $m^{th}$ temperature detecting sensor, and $V_p$ is a voltage value of a voltage output from a temperature detection voltage source.

In the exemplary embodiment, the BMS may be configured to measure the voltage values of the temperature detection voltages applied to each of the one or more temperature detecting sensors, and calculate the resistance values of the one or more temperature detecting sensors based on the measured voltage values of the temperature detection voltage and the calculated voltage value of the temperature detection voltages applied to each of the one or more temperature detecting sensors.

In the exemplary embodiment, when the BMS receives a battery temperature detection request in a state where the reference resistor is not connected with the one or more temperature detecting sensors, the BMS may be configured to sequentially connect the reference resistor with the one or more temperature detecting sensors and calculate a resistance value of each of the one or more connected temperature detecting sensors based on Equation 2 below.

$$R_n = \frac{V'_n}{V_p - V'_n} \times \left(R_p + \sum_{a=1}^{n-1} R_a\right) \qquad \langle\text{Equation 2}\rangle$$

wherein, $R_n$ is a resistance value of an $n^{th}$ temperature detecting sensor, $V_p$ is a voltage value of a voltage output from a temperature detection voltage source, $V'_n$ is a voltage value of the temperature detection voltage measured by the $n^{th}$ temperature detecting sensor, $R_p$ is a resistance value of the reference resistor, and $\sum_{a=n}^{n-1} R_a$ is a sum of the resistance values from the temperature detecting sensor located at a foremost end to the $n-1^{th}$ temperature detecting sensor and is equal to zero when n=1.

Another exemplary embodiment of the present invention provides a method of detecting a temperature of a battery, the method including: connecting one or more temperature detecting sensors, which are connected with one or more batteries, respectively, with a reference resistor and applying a temperature detection voltage to the one or more temperature detecting sensors; calculating a resistance value of the one or more temperature detecting sensors based on a voltage value of the temperature detection voltage applied to the one or more temperature detecting sensors; and detecting a temperature of the one or more batteries, which are connected with the one or more temperature detecting sensors, respectively, based on the calculated resistance value.

In the exemplary embodiment, the method may further include performing multiplexing on the one or more temperature detecting sensors, and selecting one or more temperature detecting sensors among the one or more temperature detecting sensors and connecting the selected one or more temperature detecting sensors with the reference resistor, in which the applying may include controlling application of the temperature detection voltage by a temperature detection voltage source by controlling a switch, which is interposed between the reference resistor and the temperature detection voltage source.

In the exemplary embodiment, the applying may further include connecting the one or more selected temperature detecting sensors with the reference resistor and the temperature detection voltage source, and disconnecting one or more non-selected temperature detecting sensors from the temperature detection voltage source, and when any temperature detecting sensor is not selected, blocking a space between the reference resistor and the temperature detection voltage source by controlling the switch sensor.

In the exemplary embodiment, the one or more temperature detecting sensors may include one or more thermistors, respectively.

In the exemplary embodiment, the reference resistor may be connected with a temperature detecting sensor located at a foremost end among the one or more temperature detecting sensors, and the one or more temperature detecting sensors may be sequentially connected from the temperature detecting sensor located at the foremost end to a temperature detecting sensor located at a rearmost end.

In the exemplary embodiment, the calculating may include, when the reference resistor and the one or more temperature detecting sensors are connected, calculating a voltage values of the temperature detection voltages to be applied to the one or more connected temperature detecting sensors, based on Equation 1 below.

$$V_n = \frac{\sum_{a=n}^{m} R_a}{R_p + R_T} \times V_p \qquad \langle\text{Equation 1}\rangle$$

wherein, $V_n$ is a voltage value of the temperature detection voltage to be applied to an $n^{th}$ temperature detecting sensor, m is a number of one or more connected temperature detecting sensors, $R_p$ is a resistance value of the reference resistor, $R_T$ is a sum of resistance values of the one or more connected temperature detecting sensors, $\sum_{a=n}^{m} R_a$ is a sum of resistance values from the $n^{th}$ temperature detecting sensor to an $m^{th}$ temperature detecting sensor, and $V_p$ is a voltage value of a temperature detection voltage source.

In the exemplary embodiment, the calculating may further include measuring the voltage values of the temperature detection voltages applied to each of the one or more temperature detecting sensors, and calculating the resistance values of the one or more temperature detecting sensors based on the measured voltage values of the temperature detection voltage and the calculated voltage value of the temperature detection voltages applied to each of the one or more temperature detecting sensors.

In the exemplary embodiment, the calculating may include, upon receiving a battery temperature detection request in a state where the reference resistor is not connected with the one or more temperature detecting sensors, sequentially connecting the reference resistor with the one or more temperature detecting sensors and calculating a resistance value of each of the one or more connected temperature detecting sensors based on Equation 2 below.

$$R_n = \frac{V'_n}{V_p - V'_n} \times \left(R_p + \sum_{a=1}^{n-1} R_a\right)$$ ⟨Equation 2⟩ wherein, $R_n$ is a resistance value of an $n^{th}$ temperature detecting sensor, $V_p$ is a voltage value of a voltage output from a temperature detection voltage source, $V_n'$ is a voltage value of the temperature detection voltage measured by the $n^{th}$ temperature detecting sensor, $R_p$ is a resistance value of the reference resistor, and $\Sigma_{a=n}^{n-1}$ Ra is a sum of the resistance values from the temperature detecting sensor located at a foremost end to the $n-1^{th}$ temperature detecting sensor and is equal to zero when n=1.

Advantageous Effects

The present invention has an advantage in that it is possible to measure a temperature of a battery by sequentially connecting temperature detecting units, which are connected the batteries, respectively, with a reference resistor, and applying a temperature detection voltage, calculating a resistance value of each of the temperature detecting units based on a size of the applied temperature detection voltage, and detecting temperatures of the batteries connected with the one or more temperature detecting units, respectively, based on the calculated resistance values.

Further, the present invention has an advantage in that the temperature detecting units connected to the batteries, respectively, share and use one reference resistor, so that it is not necessary to provide a temperature measuring circuit to each of the temperature detecting units, thereby decreasing the use of a pull-up resistor and a capacitor used in the temperature measuring circuit, decreasing a volume of the system, and decreasing cost.

DETAILED DESCRIPTION

Hereinafter, an exemplary embodiment is presented for helping understanding of the present invention. However, the exemplary embodiment below is simply provided for easier understanding of the present invention, and contents of the present invention are not limited by the exemplary embodiment.

Figure 2:
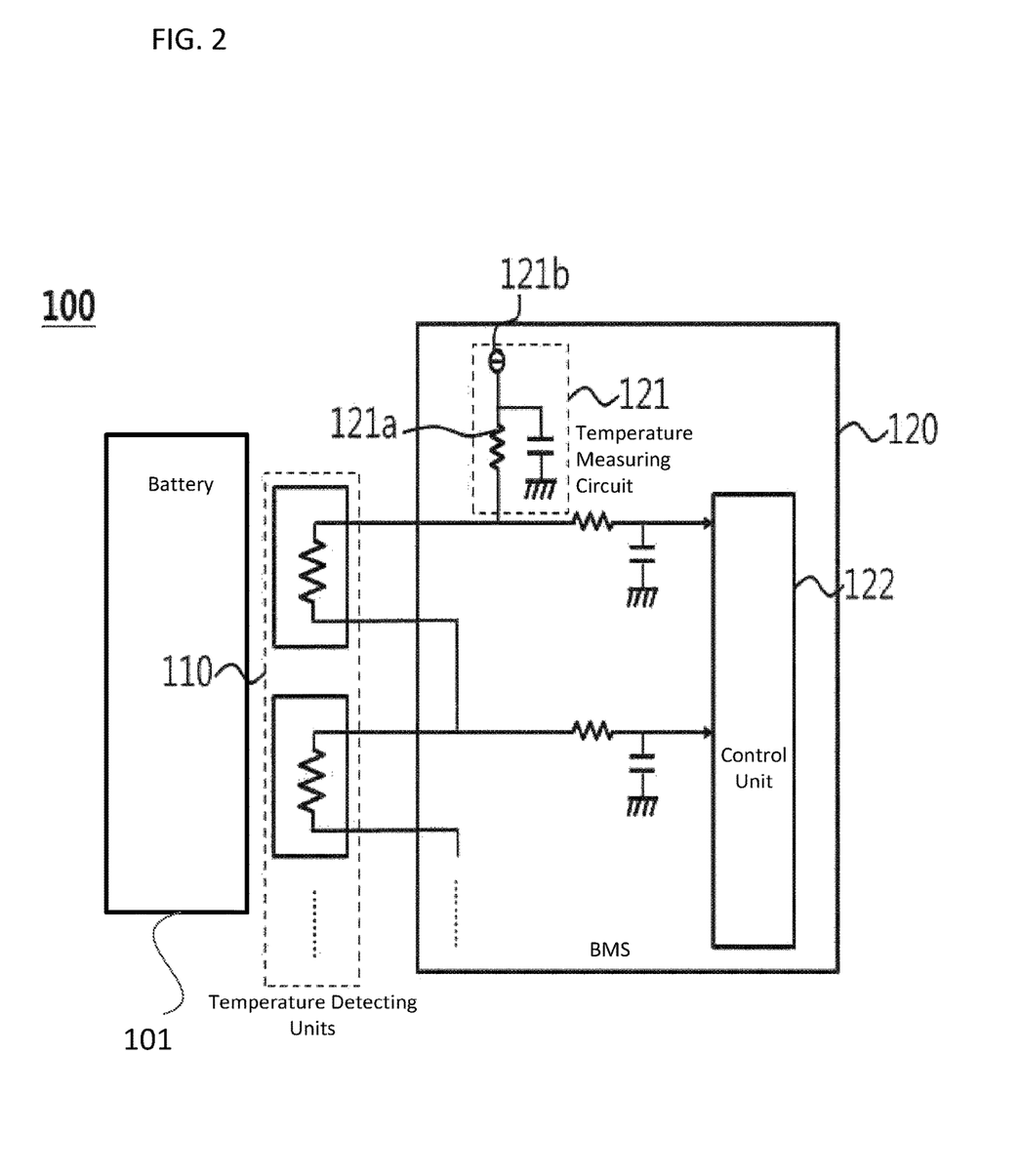
FIGS. 2 to 4 are diagrams schematically illustrating constituent elements of a system 100 for detecting a temperature of a battery according to an exemplary embodiment of the present invention.
Figure 3:
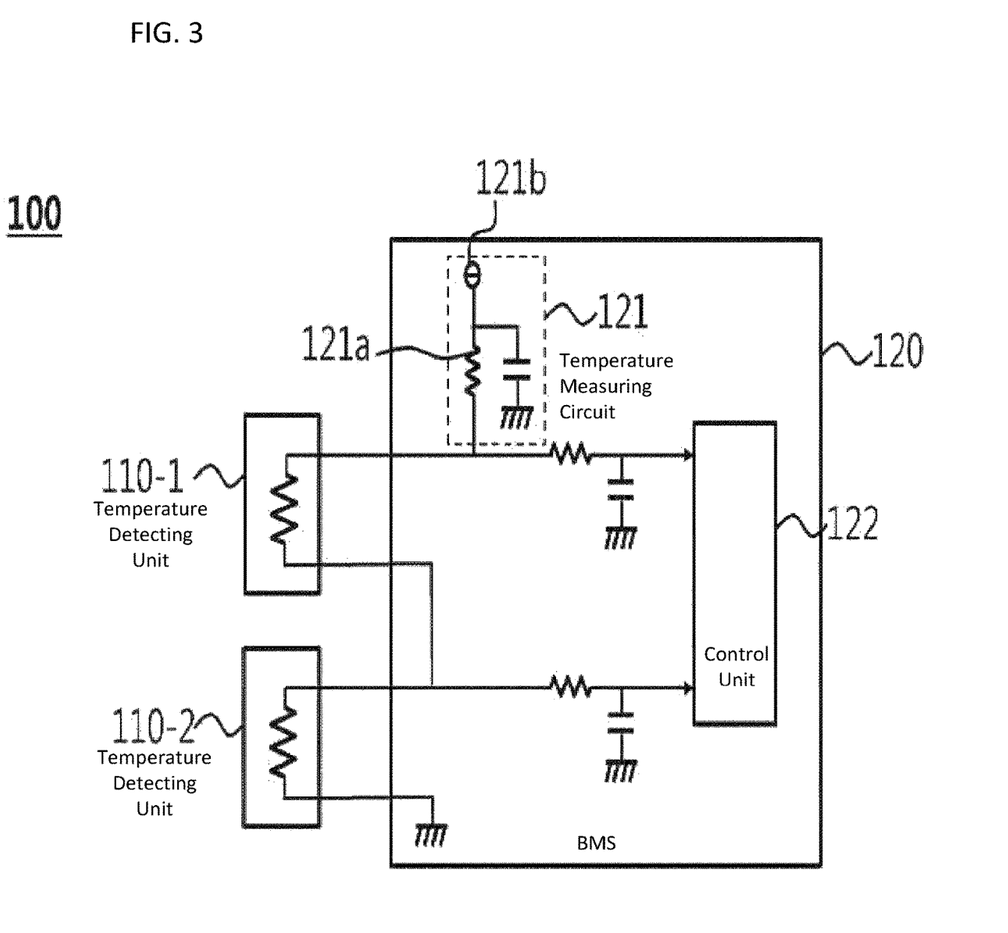
Figure 4:
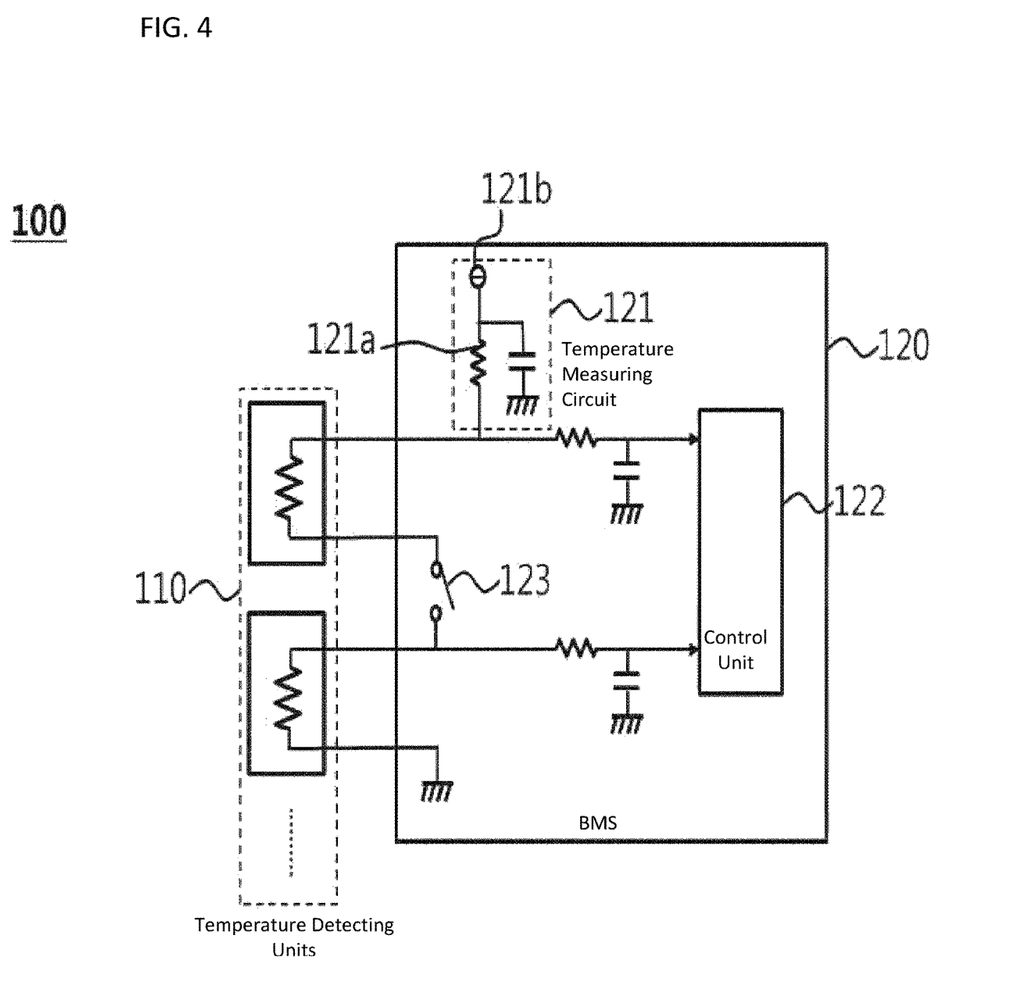

FIGS. 2 to 4 are diagrams schematically illustrating constituent elements of a system 100 for detecting a temperature of a battery according to an exemplary embodiment of the present invention.

Referring to FIGS. 2 to 4, the system 100 for detecting a temperature of a battery according to the exemplary embodiment of the present invention may include temperature detecting units 110 and a battery management system (BMS) 120.

The system 100 for detecting a temperature of a battery illustrated in FIGS. 2 to 4 is one exemplary embodiment, and constituent elements thereof are not limited to the exemplary embodiment illustrated in FIGS. 2 to 4, and may be added, changed, or deleted as necessary.

First, the temperature detecting units 110 may be connected with one or more batteries 101, respectively, and may detect temperatures of the connected batteries 101. For example, the temperature detecting units 110 may include one or more thermistors, respectively.

The thermistor is a semiconductor device, in which various oxides, such as manganese, nickel, copper, cobalt, chrome, and iron, are combined and mixed and sintered, and may be a device having a characteristic in that an electric resistance value is changed according to a temperature. For example, the thermistor may include a positive temperature coefficient (PTC) thermistor, in which a temperature and a resistance have a proportion characteristic, a negative temperature coefficient (NTC) thermistor, in which a temperature and a resistance value have an inverse proportion characteristic, and a critical temperature resistor (CIR), in which a resistance value is sharply changed at a specific temperature.

In the exemplary embodiment, the temperature detecting unit 110 may include a PTC or an NTC, and the BMS 120, which is to be described below, may select a temperature value matched to a resistance value of the PTC or the NTC to enable the temperature detecting unit 110 to detect a temperature of a battery.

In the exemplary embodiment, the one or more temperature detecting units 110 may be packaged with a battery module or a battery pack including a target battery, of which a temperature is desired to be measured.

The BMS 120 may calculate a resistance value of the one or more temperature detecting units 110 by applying a temperature detection voltage to the one or more temperature detecting units 110, and detect temperatures of one or more batteries based on the calculated resistance value. To this end, the BMS may include a temperature measuring circuit 121 and a control unit 122.

The temperature measuring circuit 121 may be connected with the one or more temperature detecting units 110 and apply a temperature detection voltage for detecting a temperature to each of the temperature detecting unit 110, and provide the applied voltage value to the control unit 122, which is to be described below. To this end, the temperature measuring circuit 121 may include a reference resistor 121a and a temperature detecting voltage source 121b.

The reference resistor 121a may be connected with the temperature detecting unit 110 located at the foremost end among the one or more temperature detecting units 110, and the one or more temperature detecting units 110 may be sequentially connected from the temperature detecting unit 110 located at the foremost end to the temperature detecting unit 110 located at the rearmost end.

In the exemplary embodiment, the reference resistor 121a and the one or more temperature detecting units 110 may be connected by a daisy chain connection scheme.

In the exemplary embodiment, a switching device 123 may be provided between the reference resistor 121a and each of the one or more temperature detecting units 110, and the reference resistor 121a and the one or more temperature detecting units 110 may be connected with each other or short-circuited through the on/off control of the switching device 123. In FIG. 4, it is illustrated that the switching device 123 is interposed only between the reference resistor 121a and the one or more temperature detecting units 110, but the present invention is not limited thereto, and the switching device 123 may be interposed between the reference resistor 121a and the temperature detecting unit 110 located at the foremost end, as well as between the reference resistor 121a and the one or more temperature detecting units 110.

In the exemplary embodiment, the reference resistor 121a may be a pull-up resistor connected between an input/output terminal of the temperature measuring circuit 121 for measuring a temperature and a temperature detection voltage source 121b, and may be connected with the one or more temperature detecting units 110 and distribute the temperature detection voltage applied from the temperature detection voltage source 121b, which is to be described below.

The temperature detection voltage source 121b may be connected with the reference resistor 121a, and may output the temperature detection voltage and apply the temperature detection voltage to the one or more temperature detecting units 110.

Herein, the temperature detection voltage may mean a voltage applied to the one or more temperature detecting units 110 for calculating resistance values of the one or more temperature detecting units 110, separately from the voltage output from the battery.

The temperature measuring circuit 121 may provide a voltage value of the temperature detection voltage, which is output from the temperature detection voltage source 121b and is applied to each of the one or more temperature detecting units 110 to the control unit 122, which is to be described below. For example, the temperature measuring circuit 121 may include an analog digital converter (ADC) (not illustrated). The temperature measuring circuit 121 may convert the temperature detection voltage applied to the one or more temperature detecting units 110 through the ADC into a digital value and provide the digital value to the control unit 122, which is to be described below.

The control unit 122 may calculate resistance values of the one or more temperature detecting units 110 based on the voltage value of the temperature detection voltage applied to each of the one or more temperature detecting units 110 provided from the temperature measuring circuit 121, and detect temperatures of the one or more batteries connected with the one or more temperature detecting units 110, respectively, based on the calculated resistance value.

In the exemplary embodiment, when the reference resistor 121a and the one or more temperature detecting units 110 are connected, the control unit 122 may calculate a voltage value of a temperature detection voltage, which is to be applied to the one or more connected temperature detecting units 110, based on Equation 1 below.

$$V_n = \frac{\sum_{a=n}^{m} R_a}{R_p + R_T} \times V_p \quad \langle \text{Equation 1} \rangle$$

Herein, $V_n$ is a voltage value of the temperature detection voltage, which is to be applied to the $n^{th}$ temperature detecting unit 110, m is the number of one or more connected temperature detecting units 110, $R_p$ is a resistance value of the reference resistor 121a, $R_T$ is a sum of resistance values of the one or more connected temperature detecting units 110, $\sum_{a=n}^{m} R_a$ is a sum of resistance values from the $n^{th}$ temperature detecting unit 110 to the $m^{th}$ temperature detecting unit 110, and $V_p$ is a voltage value of the temperature detection voltage source.

Further, the control unit 122 may measure a voltage $V_n'$ of the temperature detection voltage applied to each of the one or more temperature detecting units 110, and calculate a resistance value $R_n$ of each of the one or more temperature detecting units 110 based on the measured voltage value $V_n'$ of the temperature detection voltage and the voltage value $V_n$ of the temperature detection voltage calculated through Equation 1.

Herein, the measurement of the voltage value $V_n'$ of the temperature detection voltage by the control unit 122 may mean the reception of the voltage $V_n'$ of the temperature detection voltage applied to each of the one or more temperature detecting units 110 from the temperature measuring circuit 121.

For example, as illustrated in FIG. 3, when the reference resistor 121a and the two temperature detecting units 110-1 and 110-2 are sequentially connected, a temperature detection voltage VP output from the temperature detection voltage source 121b may be applied to the reference resistor 121a and the two temperature detecting units 110-1 and 110-2. The temperature measuring circuit 121 may provide voltage values V1' and V2' of the temperature detection voltages actually applied to the two temperature detecting units 110-1 and 110-2 to the control unit 122. In this case, the voltage values V1' and V2' of the temperature detection voltages actually applied to the two temperature detecting units 110-1 and 110-2 may be 3 V and 1 V, respectively. Further, the control unit 122 may calculate voltage values V1 and V2 of the temperature detection voltages, which are to be applied to the two temperature detecting units 110-1 and 110-2, by using Equation 1. Herein, when a resistance value $R_p$ of the reference resistor 121a is 10 KΩ and the voltage value $V_p$ of the temperature detection voltage output from the temperature detection voltage source 121b is 5 V, the voltage value V1 of the temperature detection voltage, which is to be applied to the temperature detecting unit 110-1 located at the foremost end, may be 5(R1+R2)/(10 KΩ+R1+R2), and the voltage value V2 of the temperature detection voltage, which is to be applied to the second temperature detecting unit 110-2, may be 5*R2/(10 KΩ+R1+R2).

In this case, the voltage values V1' and V2' of the temperature detection voltages actually applied to the two temperature detecting units 110-1 and 110-2 and the voltage values V1 and V2 of the temperature detection voltages, which are to be applied to the two temperature detecting units 110-1 and 110-2, need to have the same values, so that two equations, "3 V=5 V(R1+R2)/(10Ω+R1+R2)" and "1 V=5V×R2/(10KΩ+R1+R2)" may be calculated.

The control unit 122 may simultaneously calculate the two calculated equations. For example, the control unit 122 may calculate "R1=15−R−2" through the first equation, "3 V=(R1+R2)/(10 KΩ+R1+R2)", and may calculate values of R1 and R2 as 10 KΩ and 5 KΩ by substituting "R1=15−R−2" to the second equation.

In the exemplary embodiment, the control unit 122 may detect a temperature of the battery connected with the temperature detecting unit 110 based on the calculated resistance value $R_n$ of the temperature detecting unit 110. For example, when the temperature detecting unit 110 includes the PTC, the BMS 120 may experimentally measure a resistance value according to a temperature of the PTC, and match the measured resistance value to a temperature value and store the matched value in a data table or a look-up table. Then, the control unit 122 may calculate the resistance value of the temperature detecting unit 110 including the PTC, and detect a temperature value of the battery connected with the temperature detecting unit 110 by selecting the temperature value matched with the calculated resistance value in the pre-stored data table or the look-up table. However, the present invention is not limited thereto, and any scheme of calculating a temperature by using a resistance value may be applied. For example, when one or more temperature detecting units 110 include thermistors, a temperature may be detected by substituting the resistance value to the temperature calculation equation considering the component of the thermistor.

In the exemplary embodiment, the one or more temperature detecting units 110 and the reference resistor 121*a* may be in a non-connected state. In this case, when the control unit 122 receives a battery temperature detection request in the state where the reference resistor 121*a* and the one or more temperature detecting units 110 are not connected, the control unit 122 may sequentially connect the reference resistor 121*a* and the one or more temperature detecting units 110 and calculate a resistance value of each of the one or more connected temperature detecting units 110 based on Equation 2 below.

$$R_n = \frac{V'_n}{V_p - V'_n} \times \left(R_p + \sum_{a=1}^{n-1} R_a\right)$$

Herein, $R_n$ is a resistance value of the $n^{th}$ temperature detecting unit 110, $V_p$ is a voltage value of the temperature detection voltage, $V'_n$ is a voltage value of the temperature detection voltage measured by the $n^{th}$ temperature detecting unit 110, $R_p$ is a resistance value of the reference resistor 121*a*, and $\sum_{a=n}^{n-1} R_a$ is a sum of the resistance values from the temperature detecting unit 110 located at the foremost end to the $n-1^{th}$ temperature detecting unit 110 (however, when $n=1$, $\sum_{a=n}^{m} R_a$ is 0).

For example, when the battery temperature detection request is received in the state where the reference resistor 121*a* and the one or more temperature detecting units 110 are not connected, the control unit 122 may connect the reference resistor 121*a* and the temperature detecting unit 110 located at the foremost end.

Herein, the battery temperature detection request may mean a signal output when a user of the system 100 for detecting a temperature of a battery according to the exemplary embodiment of the present invention desires to detect a temperature of the battery or an external system desires to obtain temperature information as state information of the battery.

When the battery temperature detection request is input, the control unit 122 may connect the reference resistor 121*a* and the temperature detecting unit 110 located at the foremost end by controlling the switching device (not illustrated) interposed between the reference resistor 121*a* and the temperature detecting unit 110 located at the foremost end, and calculate a resistance value R1 of the temperature detecting unit 110 located at the foremost end by using Equation 2. For example, when a resistance value $R_P$ of the reference resistor 121*a* is 10 KΩ, a voltage value $V_P$ of the temperature detection voltage is 5 V, and the voltage value $V_1'$ of the temperature detection voltage applied to the temperature detecting unit 110 located at the foremost end measured by the temperature measuring circuit 121 is 2.5 V, the resistance value R1 of the temperature detecting unit 110 located at the foremost end may be (2.5 V×10 KΩ)/(5 V−2.5 V), which is 10 KΩ.

After the resistance value R1 of the temperature detecting unit 110 located at the foremost end is calculated, the control unit 122 may connect the second temperature detecting unit 110 and the temperature detecting unit 110 located at the foremost end by controlling the switching device 123 interposed between the second temperature detecting unit 110 and the temperature detecting unit 110 located at the foremost end, and calculate a resistance value R2 of the second temperature detecting unit 110 by using Equation 2. For example, when the voltage value $V_2'$ of the temperature detection voltage applied to the second temperature detecting unit 110 is 1 V, the calculated resistance value R2 of the second temperature detecting unit 110 may be (1 V×(10 KΩ+10 KΩ))/(5 V−1 V), which is 5 KΩ. The control unit 122 may calculate up to a resistance value of the temperature detecting unit 110 located at the rearmost end by the foregoing method, and after the resistance value of the temperature detecting unit 110 located at the rearmost end is calculated, the connection state of the reference resistor 121*a* and the one or more temperature detecting units 110 may be changed to an off state. Hereinafter, a system 100' for detecting a temperature of a battery according to another exemplary embodiment of the present invention will be described with reference to FIG. 5.

Figure 5:
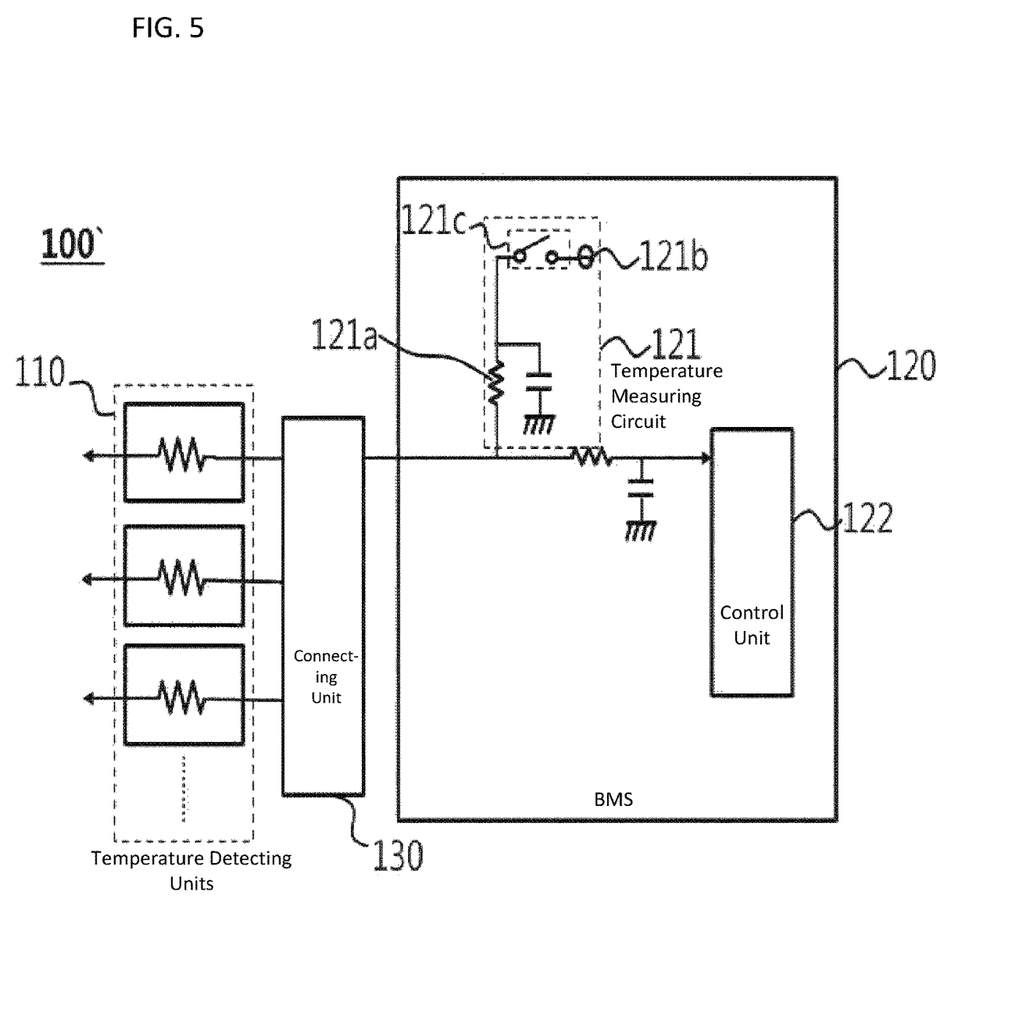
FIG. 5 is a diagram schematically illustrating constituent elements of a system 100' for detecting a temperature of a battery according to another exemplary embodiment of the present invention.

FIG. 5 is a diagram schematically illustrating constituent elements of a system 100' for detecting a temperature of a battery according to another exemplary embodiment of the present invention.

Referring to FIG. 5, the system 100' for detecting a temperature of a battery according to another exemplary embodiment of the present invention may additionally include a connecting unit 130, compared to the system 100 for detecting a temperature of a battery according to the exemplary embodiment of the present invention illustrated in FIGS. 2 to 4.

The connecting unit 130 may perform multiplexing for one or more temperature detecting units 110, and may select any one temperature detecting unit 110 among the one or more temperature detecting units 110 and connect the selected temperature detecting unit 110 with a reference resistor 121*a*. For example, the connecting unit 130 may be a multiplexer, which is capable of performing multiplexing.

Herein, the multiplexing may mean that multiple signals or information stream are simultaneously transmitted in the form of a single complex signal, and a reception side restores the single complex signal to separate signals.

An input terminal of the connecting unit 130 may be connected with the one or more temperature detecting units 110, and the connecting unit 130 may select any one or more temperature detecting units 110 among the one or more temperature detecting units 110 and selectively connect the selected temperature detecting unit 110 based on the control of a control unit 122.

A BMS 120 connects the one or more temperature detecting units 110 selected by the connecting unit 130 with the reference resistor 121*a* and a temperature detection voltage source 121*b*, and the BMS 120 may disconnect the connection between the one or more temperature detecting units 110, which are not selected by the connecting unit 130 and the temperature detection voltage source 121b. Further, when the connecting unit 130 does not select any temperature detecting unit, the BMS 120 may block the space between the reference resistor 121a and the temperature detection voltage source 121b. To this end, the BMS 120 may further include a switch unit 121c, which is interposed between the reference resistor 121a and the temperature detection voltage source 121b and is capable of controlling the supply of the temperature detection voltage by the temperature detection voltage source 121b.

In the system 100' for detecting a temperature of a battery according to another exemplary embodiment of the present invention, when a battery temperature detection request is input from the outside, the control unit 122 may connect the one or more temperature detecting units 110 connected with a battery, of which a temperature is desired to be detected, and the reference resistor 121a by controlling the connecting unit 130, and apply a temperature detection voltage to the connected temperature detecting unit 110. In this case, a resistance value $R_n$ of the connected temperature detecting unit 110 may be calculated by using a voltage value $V_P$ of the temperature detection voltage, a resistance value $R_P$ of the reference resistor 121a, and a voltage distribution law. For example, when a resistance value $R_P$ of the reference resistor 121a is 10 KΩ, a voltage value $V_P$ of the temperature detection voltage is 5 V, and a voltage value $V_n'$ of the temperature detection voltage applied to the temperature detecting unit 110 connected through the connecting unit 130 is 2.5 V, a resistance value Rn of the connected temperature detecting unit 110 may be calculated as 10 KΩ through the voltage distribution law. Hereinafter, a method of detecting a temperature of a battery by using the system 100 for detecting a temperature of a battery according to the exemplary embodiment of the present invention will be described with reference to FIG. 6.

Figure 6:
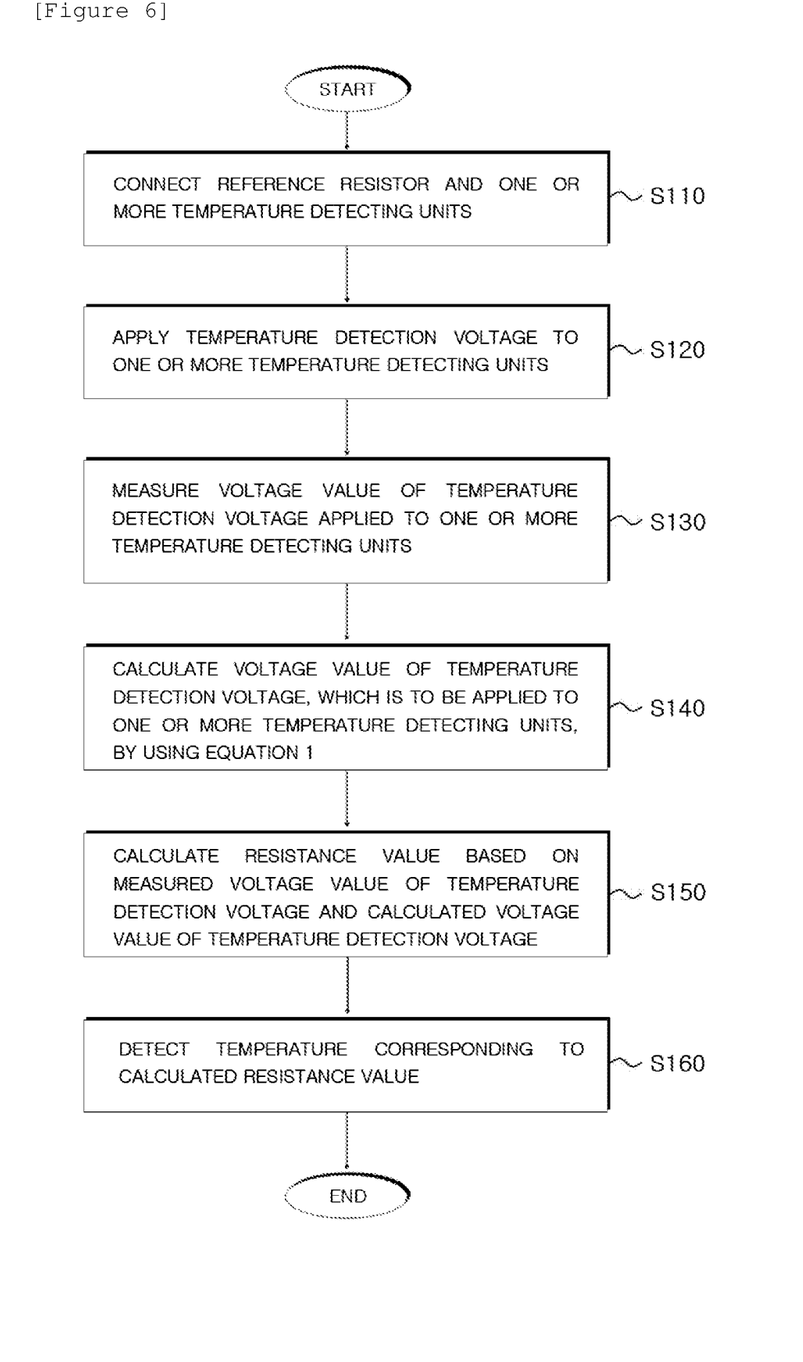
FIG. 6 is a flowchart for describing a series of processes for detecting a temperature of a battery by using the system 100 for detecting a temperature of a battery according to the exemplary embodiment of the present invention.

FIG. 6 is a flowchart for describing a series of processes for detecting a temperature of a battery by using the system 100 for detecting a temperature of a battery according to the exemplary embodiment of the present invention.

Referring to FIG. 6, first, a reference resistor and one or more temperature detecting units are connected (S110), and a temperature detection voltage is applied to the connected reference resistor and one or more temperature detecting units (S120). Then, a voltage value of the temperature detection voltage applied to the one or more temperature detecting units in operation S120 is measured (S130), and a voltage value of a temperature detection voltage, which is to be applied to the one or more temperature detecting units, is calculated by using Equation 1 (S140).

A resistance value of the one or more temperature detecting units is calculated based on the voltage value of the temperature detection voltage applied to the one or more temperature detecting units measured in operation S130 and the voltage value of the temperature detection voltage, which is to be applied to the one or more temperature detecting units, calculated in operation S140 (S150), and a temperature of a battery connected with the one or more temperature detecting units is detected by selecting a temperature value matched with the calculated resistance value (S160).

The method of detecting a temperature of a battery has been described with reference to the flowchart presented in the drawing. For the simple description, the method is illustrated and described with the series of blocks, but the present invention is not limited to the order of the blocks, and some blocks may occur in a different order from the order illustrated and described in the present specification or may occur with other blocks at the same time, and various other branches, a flow path, and orders of the blocks achieving the same or similar result may be implemented. Further, for the implementation of the method described in the present specification, all of the illustrated blocks may not be required.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A system for detecting a temperature of one or more batteries, the system comprising:
    a plurality of temperature detecting sensors, which are connected with the one or more batteries, respectively, wherein a positive end of a first temperature detecting sensor is connected with a reference resistor and a positive end of each other temperature detecting sensor is connected to a negative end of a previous temperature detecting sensor; and
    a battery management system (BMS) configured to:
    apply a temperature detection voltage to the plurality of temperature detecting sensors,
    calculate resistance values of the plurality of temperature detecting sensors based on a voltage value of the applied temperature detection voltage, and
    detect a temperature of the one or more batteries connected with the plurality of temperature detecting sensors, respectively, based on the calculated resistance values,
    wherein the plurality of temperature detecting sensors includes m temperature detecting sensors, and wherein the BMS is configured to:
        measure the voltage values of the plurality of temperature detecting sensors, and
        calculate the resistance values of the one or more temperature detecting sensors based on the measured voltage values of the temperature detection sensors and a plurality of equations, wherein each equation of the plurality of equations is associated with a respective $n^{th}$ temperature detecting sensor and equates a measured voltage value of the $n^{th}$ temperature detecting sensor and a calculation expression of the $n^{th}$ temperature detecting sensor, wherein the calculation expression includes a voltage output from a voltage source, a reference resistance, and a plurality of variables indicating resistances of related temperature detecting sensors.

2. The system of claim 1, wherein the one or more temperature detecting sensors include one or more thermistors, respectively.

3. The system of claim 1, wherein when the reference resistor and the plurality of temperature detecting sensors are connected, the BMS is configured to calculate voltage values of the temperature detection voltages to be applied to the plurality of connected temperature detecting sensors, based on Equation 1 below $$V_n = \frac{\sum_{a=n}^{m} R_a}{R_p + R_T} \times V_p \qquad \langle\text{Equation 1}\rangle$$

wherein, $V_n$ is a voltage value of the temperature detection voltage to be applied to an $n^{th}$ temperature detecting sensor, m is a number of the plurality of connected temperature detecting sensors, $R_p$ is a resistance value of the reference resistor, $R_T$ is a sum of resistance values of the plurality of connected temperature detecting sensors, $\Sigma_{a=n}^{m} R_a$ is a sum of resistance values from the $n^{th}$ temperature detecting sensor to an $m^{th}$ temperature detecting sensor, and $V_p$ is a voltage value of the voltage output.

4. The system of claim 1, wherein when the BMS receives a battery temperature detection request in a state where the reference resistor is not connected with the one or more temperature detecting sensors, the BMS is configured to:
- sequentially connect the reference resistor with the one or more temperature detecting sensors, and
- calculate a resistance value of each of the one or more connected temperature detecting sensors based on Equation 2 below $$R_n = \frac{V_n'}{V_p - V_n'} \times \left( R_p + \sum_{a=1}^{n-1} R_a \right) \quad \langle\text{Equation 2}\rangle$$

wherein, $R_n$ is a resistance value of an $n^{th}$ temperature detecting sensor, $V_p$ is a voltage value of the voltage output, $V_n$ is a voltage value of the temperature detection voltage applied to the $n^{th}$ temperature detecting sensor, $R_p$ is a resistance value of the reference resistor, and $\Sigma_{a=n}^{n-1} R_a$ is a sum of the resistance values from the temperature detecting sensor located at a foremost end to an $n-1^{th}$ temperature detecting sensor, and is equal to zero when n=1.

5. A method of detecting a temperature of one or more batteries, the method comprising:
- connecting a plurality of temperature detecting sensors, which are connected with the one or more batteries, respectively, whereby a positive end of a first temperature detecting sensor is connected with a reference resistor and a positive end of each other temperature detecting sensor is connected to a negative end of a previous temperature detecting sensor;
- applying, by a battery management system (BMS), a temperature detection voltage to the plurality of temperature detecting sensors;
- calculating, by the BMS, resistance values of the plurality of temperature detecting sensors based on a voltage value of the temperature detection voltage applied to the one or more temperature detecting sensors; and
- detecting, by the BMS, a temperature of the one or more batteries, which are connected with the plurality of temperature detecting sensors, respectively, based on the calculated resistance values,
- wherein the plurality of temperature detecting sensors includes m temperature detecting sensors, and wherein the calculating further includes:
  - measuring, by the BMS, the voltage values of the plurality of temperature detecting sensors; and
  - calculating, by the BMS, the resistance values of the one or more temperature detecting sensors based on the measured voltage values of the temperature detecting sensors and a plurality of equations, wherein each equation of the plurality of equations is associated with a respective $n^{th}$ temperature detecting sensor and equates a measured voltage value of the $n^{th}$ temperature detecting sensor and a calculation expression of the $n^{th}$ temperature detecting sensor, wherein the calculation expression includes a voltage output from a voltage source, a reference resistance, and a plurality of variables indicating resistances of related temperature detecting sensors.

6. The method of claim 5, wherein the one or more temperature detecting sensors include one or more thermistors, respectively.

7. The method of claim 5, wherein the calculating includes, when the reference resistor and the plurality of temperature detecting sensors are connected, calculating voltage values of the temperature detection voltages to be applied to the plurality of connected temperature detecting sensors, based on Equation 1 below $$V_n = \frac{\sum_{a=n}^{m} R_a}{R_p + R_T} \times V_p \quad \langle\text{Equation 1}\rangle$$

wherein, $V_n$ is a voltage value of the temperature detection voltage to be applied to an $n^{th}$ temperature detecting sensor, m is a number of the plurality of connected temperature detecting sensors, $R_p$ is a resistance value of the reference resistor, $R_T$ is a sum of resistance values of the plurality of connected temperature detecting sensors, $\Sigma_{a=n}^{m} R_a$ is a sum of resistance values from the $n^{th}$ temperature detecting sensor to an $m^{th}$ temperature detecting sensor, and $V_p$ is a voltage value of the voltage output.

8. The method of claim 5, wherein the calculating includes, upon receiving a battery temperature detection request in a state where the reference resistor is not connected with the one or more temperature detecting sensors:
- sequentially connecting the reference resistor with the one or more temperature detecting sensors; and
- calculating a resistance value of each of the one or more connected temperature detecting sensors based on Equation 2 below $$R_n = \frac{V_n'}{V_p - V_n'} \times \left( R_p + \sum_{a=1}^{n-1} R_a \right) \quad \langle\text{Equation 2}\rangle$$

wherein, $R_n$ is a resistance value of an $n^{th}$ temperature detecting sensor, $V_p$ is a voltage value of the voltage output, $V_n$ is a voltage value of the temperature detection voltage applied to the $n^{th}$ temperature detecting sensor, $R_p$ is a resistance value of the reference resistor, and $\Sigma_{a=n}^{n-1} R_a$ is a sum of the resistance values from the temperature detecting sensor located at a foremost end to an $n-1^{th}$ temperature detecting sensor and is equal to zero when n=1.

\* \* \* \* \*